(12) United States Patent
Nakano et al.

(10) Patent No.: US 7,892,666 B2
(45) Date of Patent: *Feb. 22, 2011

(54) CASE FOR FILM-COVERED ELECTRICAL DEVICE AND FILM-COVERED ELECTRICAL DEVICE ASSEMBLAGE

(75) Inventors: Hisako Nakano, Sagamihara (JP); Takaaki Fujitani, Sagamihara (JP); Tetsuo Kobayashi, Sagamihara (JP)

(73) Assignees: NEC Corporation, Tokyo (JP); Fuji Jukogyo Kabushiki Kaisha, Tokyo (JP)

( * ) Notice: Subject to any disclaimer, the term of this patent is extended or adjusted under 35 U.S.C. 154(b) by 705 days.

This patent is subject to a terminal disclaimer.

(21) Appl. No.: 11/813,325

(22) PCT Filed: Dec. 26, 2005

(86) PCT No.: PCT/JP2005/023720

§ 371 (c)(1),
(2), (4) Date: Aug. 16, 2007

(87) PCT Pub. No.: WO2006/073071

PCT Pub. Date: Jul. 13, 2006

(65) Prior Publication Data

US 2008/0187820 A1    Aug. 7, 2008

(30) Foreign Application Priority Data

Jan. 4, 2005    (JP)    ............................. 2005-000125

(51) Int. Cl.
*H01M 2/12*    (2006.01)
*H01M 10/50*   (2006.01)

(52) U.S. Cl. ........................................ 429/83; 429/120
(58) Field of Classification Search ................... 429/83, 429/120

See application file for complete search history.

(56) References Cited

U.S. PATENT DOCUMENTS

| | | | |
|---|---|---|---|
| 4,324,844 A * | 4/1982 | Kothmann | 429/120 X |
| 5,501,918 A * | 3/1996 | Gruenstern et al. | 429/120 |
| 5,585,204 A | 12/1996 | Oshida et al. | |
| 5,824,432 A * | 10/1998 | Currle | 429/120 |
| 6,579,642 B2 * | 6/2003 | Yamane et al. | 429/120 |
| 7,351,493 B2 * | 4/2008 | Uemoto et al. | 429/120 |
| 7,504,799 B2 * | 3/2009 | Hamada et al. | 429/120 X |
| 2003/0219635 A1 | 11/2003 | Lee et al. | |
| 2004/0036444 A1 | 2/2004 | Oogami | |

FOREIGN PATENT DOCUMENTS

JP    6-1150 A    1/1994

* cited by examiner

*Primary Examiner*—Stephen J. Kalafut
(74) *Attorney, Agent, or Firm*—Sughrue Mion, PLLC (57) ABSTRACT

The cell case (10) of the present invention includes first cooling channel wall surfaces (13c) and second cooling channel wall surfaces (13d) that form a cooling channel (13A) through which cooling air flows for cooling a film-covered battery (1); wherein the area of the opening of a portion that is the outlet (13b) of cooling channel (13A) is greater than the area of the opening of the portion that is the inlet (13a) of the cooling channel (13A).

2 Claims, 11 Drawing Sheets

CASE FOR FILM-COVERED ELECTRICAL DEVICE AND FILM-COVERED ELECTRICAL DEVICE ASSEMBLAGE

TECHNICAL FIELD

The present invention relates to a case for a film-covered electrical device for housing a film-covered electrical device in which electrical device components represented by, for example, a battery or a capacitor are accommodated in sheathing film, and to a film-covered electrical device assemblage.

BACKGROUND ART

Recent years have seen rapid progress in the development of electric vehicles and hybrid electric vehicles (hereinbelow referred to as "electric vehicles") in which motor drive batteries are mounted. Batteries that are mounted in electric vehicles are naturally required to be both lighter in weight and thinner in shape to improve handling characteristics and mileage. Film-covered batteries that employ a laminate material are being developed in order to make batteries lighter and thinner. The laminate material is a thin film in which a metal layer of, for example, aluminum, and a heat-fusing resin layer are laminated with an interposed adhesive layer. In addition, the laminate material is typically of a construction in which both surfaces of a thin metal layer of, for example, aluminum are covered by thin resin layers, the resulting laminate material being not only strongly resistant to acid or alkali, but also light and flexible.

A film-covered battery in which the electricity-generating components are covered by a laminate material, although light in weight, also has low rigidity and is therefore prone to the effects of vibration and shocks, and these problems must be solved if the battery is to be mounted in a vehicle. A technique of clasping and securing a film-covered battery in a case is known as a means for solving these problems. However, accommodating a film-covered battery in a case raises problems regarding cooling the film-covered battery. Failure to sufficiently and uniformly suppress increase in temperature by means of forced-air cooling to obtain adequate performance of a battery will hasten the deterioration of the battery and cause degradation of the regeneration efficiency due to increase in internal resistance.

The use of a film-covered battery as the drive source of an electric vehicle necessitates the adoption of a battery cell assemblage (herein below referred to as "combined battery") in which a plurality of film-covered batteries are stacked in multiple layers, and further, in which the stacked batteries are electrically interconnected to obtain a desired output voltage. A technique has been disclosed in the related art in which cooling air flows uniformly between each of the batteries that make up a combined battery. JP-A-H06-001150 discloses a configuration in which the size of gaps in a parallel direction between each of the batteries in a battery case increases with increasing distance from the inlet of the cooling air. This configuration equalizes the amount of cooling air that flows through gaps in areas close to the inlets and the amount of cooling air that flows through gaps in areas distant from the inlets in order to uniformly cool each battery.

DISCLOSURE OF THE INVENTION

Problem to be Solved by the Invention

In JP-A-H06-001150, uniform cooling of each battery is achieved by enlarging the cooling channel, which is the spacing of the arrangement of batteries, in the direction of flow of cooling air. However, when arranged in the form of a combined battery, not only must each battery be uniformly cooled, but each battery must also be cooled efficiently. In addition, because the cooling air captures heat from the battery and therefore becomes hot, it expands as it flows downstream. In other words, when a combined battery is to be cooled, a cooling structure is required that not only is capable of adequately cooling each battery in addition to cooling the combined battery as a whole, but that also takes into consideration changes in the state of the cooling air caused by increase in temperature.

It is therefore an object of the present invention to provide a case for a film-covered electrical device and film-covered electrical device assemblage that enable sufficient cooling of each battery.

Means for Solving the Problem

According to the case for a film-covered electrical device of the present invention for achieving the above-described object, a case for a film-covered electrical device that houses a film-covered electrical device in which electrical device components that can charge and discharge electricity are covered by a film includes a cooling channel through which cooling air flows that is supplied from the outside for cooling the film-covered electrical device, wherein the area of the opening in the portion that serves as the outlet of the cooling channel is greater than the area of the opening of the portion that serves as the inlet of the cooling channel.

In the case for a film-covered electrical device of the present invention of the above-described construction, the area of the opening on the outlet side is greater than the area of the opening on the inlet side. The cooling air that flows through the opening on the inlet side has not yet captured heat from the film-covered electrical device and is therefore in a low temperature state and at a higher density. Cooling air that flows through the opening on the outlet side has captured heat from the film-covered electrical device and is therefore at a high temperature and has expanded. In other words, in the case for a film-covered electrical device of the present invention, the area of the opening on the outlet side is increased in accordance with the increase in volume of the cooling air that has expanded, whereby cooling air that has attained a high temperature can be effectively exhausted from the outlet without stagnation in the cooling channel. As a result, excellent cooling characteristics can be obtained.

In addition, the case for a film-covered electrical device of the present invention may have an area of the wall surfaces that form the cooling channel in which the spacing between the opposing wall surfaces increases with progression in the direction from the inlet and toward the outlet. For example, in the case of a cooling channel having a channel profile that is a rectangular shape, the spacing of the opposing wall surfaces widens in accordance with the flow of the cooling air that flows while undergoing expansion, whereby the cooling air can be smoothly guided to the outlet. In this way, cooling air that has attained a high temperature can be exhausted without stagnation and excellent cooling characteristics can be achieved.

In addition, the case for a film-covered electrical device of the present invention may include an area in which the flow path profile of the cooling channel increases with progression in the direction from the inlet and toward the outlet.

In an example of a cooling channel in which the shape of the wall surfaces is a circular arc, the channel profile is progressively increased together with the flow of the cooling air that flows while undergoing expansion, whereby the cooling air can be smoothly conducted to the outlet. In this way, the hot cooling air can be exhausted without stagnation and excellent cooling characteristics can be achieved.

In addition, the case for a film-covered electrical device of the present invention may include an exhaust passage for guiding to the outside gas that is exhausted from a gas exhaust part provided in the sheathing film of the film-covered electrical device, and at least one of the wall surfaces that form the cooling channel may be the side wall surface of the exhaust passage. In other words, in the case for a film-covered electrical device of the present invention, the side wall surfaces of the exhaust passage can also be used to form the cooling channel, whereby the cooling channel need not be separately provided, this form being advantageous in terms of both simple construction and lower costs.

In addition, in the case for a film-covered electrical device of the present invention, the case for a film-covered electrical device may be made up from a frame, and at least one of the wall surfaces that make up the cooling channel may be a portion of the frame. In this example of the case for a film-covered electrical device of the present invention as well, the side wall surfaces of the exhaust passage can also be used to form the cooling channel, this form being advantageous in terms of both simplified construction and cost.

The case for a film-covered electrical device of the present invention may also be of a construction in which cooling air that flows through cooling channels successively cools a plurality of film-covered electrical devices that are housed in parallel. In this case, a plurality of batteries can be housed in a single case to enable cooling together in a group, whereby a reduction in the number of parts can be realized.

The case for a film-covered electrical device of the present invention may also include a cooling air supply path for supplying cooling air from the outside midway in the flow path of the cooling channel. In this case, low-temperature cooling air can be supplied to the cooling air that has become hot inside the cooling channel to lower the temperature of the cooling air, whereby an improvement in cooling efficiency can be achieved.

The case for a film-covered electrical device of the present invention is made up from two frames for housing a film-covered electrical device in which an electrical device component that is capable of charging and discharging electricity is covered by a film, and further, includes in either one of the frames an exhaust passage for guiding to the outside the gas that has been expelled from a gas exhaust part provided in the film of the film-covered electrical device; wherein:

inner surfaces are formed on opposing surfaces of the frames that confront each other, these inner surfaces clasping heat-seal parts of the periphery of the film that have been heat-sealed in the heat-seal parts, and unevenness is provided in the outer surfaces that are the surfaces on the opposite sides of the inner surfaces;

when stacking with other cases for film-covered electrical devices, the inlet and outlet of the cooling channel through which cooling air flows that is supplied from the outside for cooling the film-covered electrical device are formed between the outer surfaces of the frames and the frames of the other cases for film-covered electrical devices;

the wall surfaces of the cooling channel include: the side walls of an exhaust passage, the frames, the surfaces of the film-covered electrical device inside the case for a film-covered electrical device, and the surfaces of the other film-covered electrical devices inside the other cases for film-covered electrical devices; and the area of the opening of the outlet is greater than the area of the opening of the inlet, and moreover, a region is included in which the flow path profile of the cooling channel becomes larger with progression in the direction from the inlet and toward the outlet.

In the above-described case for a film-covered electrical device of the present invention, a cooling channel and an inlet and outlet of the cooling channel are formed by stacking with other cases of film-covered electrical devices with film-covered electrical devices housed inside. In other words, when batteries are combined, the case for a film-covered electrical device of the present invention can use the components of other cases of film-covered electrical devices to form cooling channels. This device is therefore advantageous in terms of cost because the construction can be simplified and the number of parts can be reduced. In addition, the present invention can also avoid an increase in the size of the combined battery.

In addition, in the case for a film-covered electrical device of the present invention, the area of the opening on the outlet side is made greater than the area of the opening on the inlet side. On the inlet side, cooling air, which has not yet captured the heat of the film-covered electrical device, flows at low temperature and high density. On the outlet side, cooling air flows that has captured heat from the film-covered electrical device and that has therefore been heated to a high temperature and undergone expansion. In other words, the area of the opening on the outlet side is increased to accord with the cooling air that has expanded and thus has increased volume, and the passage profile is enlarged to accord with the flow of cooling air that flows while undergoing expansion. As a result, the case for a film-covered electrical device of the present invention is able to smoothly guide cooling air to the outlet without allowing the cooling air to stagnate within the cooling channel. In this way, excellent cooling characteristics can be obtained.

The film-covered electrical device assemblage of the present invention is realized by stacking two or more cases for film-covered electrical devices of the present invention that house film-covered electrical devices.

THE EFFECT OF THE INVENTION

According to the present invention, the area of the opening on the outlet side is enlarged in accordance with cooling air that expands due to increase in temperature and that therefore increases in volume, whereby any influence upon flow resulting from the expansion of the cooling air can be reduced and excellent cooling characteristics can be obtained.

BEST MODE FOR CARRYING OUT THE INVENTION

First Embodiment

Figure 1:
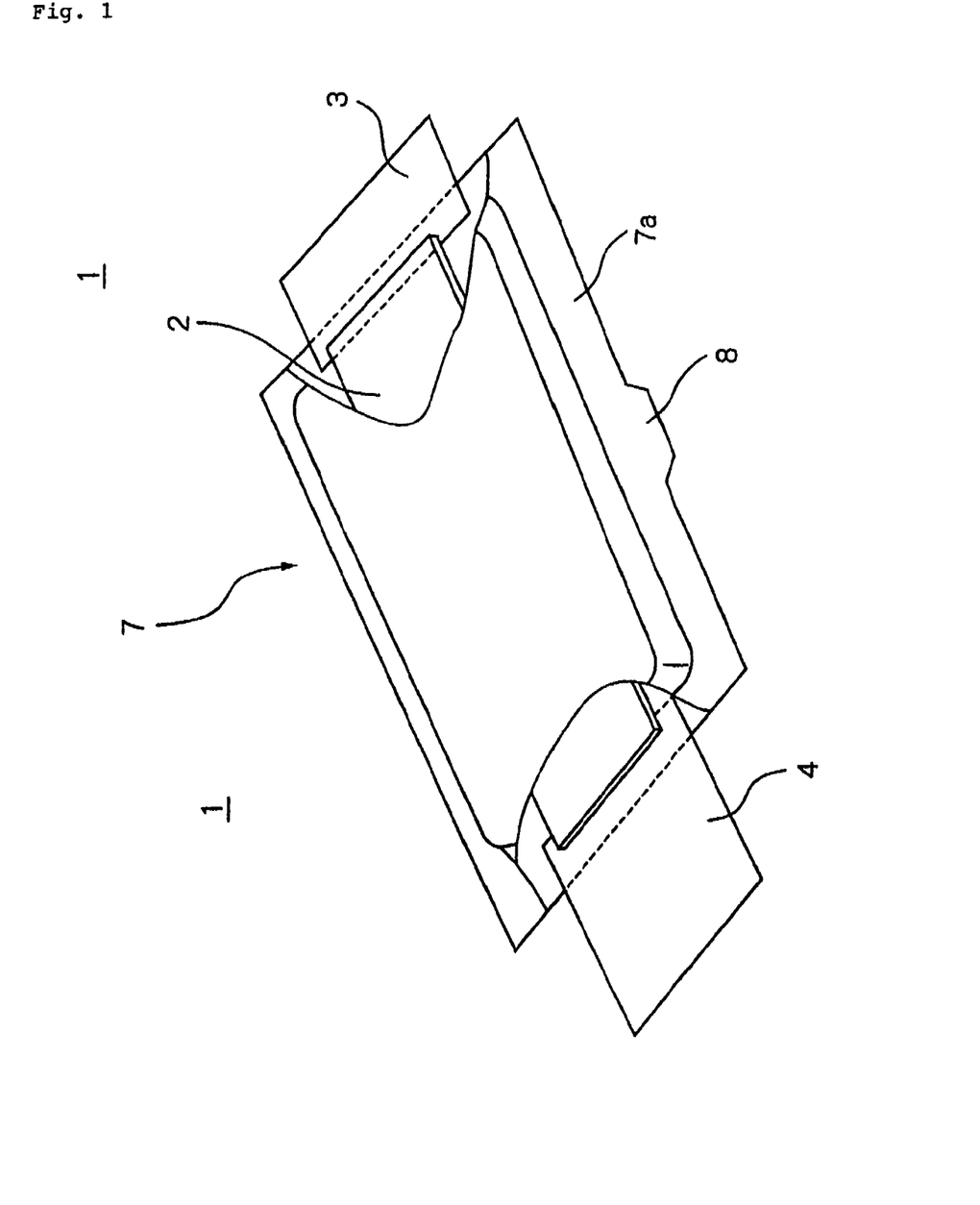
FIG. 1 is an outside perspective view of a film-covered battery that can be applied to the present invention.

FIG. 1 shows an outside perspective view of the film-covered battery of the present embodiment.

Film-covered battery 1 of the present embodiment includes: electricity-generating components 2 that include a positive active electrode, a negative active electrode, and an electrolyte; and a laminate film 7 formed by stacking a metal film such as aluminum and a heat-fusing resin film. Film-covered battery 1 has a construction in which electricity-generating components 2 are hermetically sealed by two laminate films 7. In other words, for film-covered battery 1 of the present embodiment, three sides of heat-seal parts 7a, which are the four sides of laminate films 7, are heat-sealed to produce a bag form.

The air inside this form is evacuated by vacuum suction from the one remaining open side. Finally, the one remaining heat-seal part 7a is heat-sealed to hermetically seal electricity-generating components 2 by means of the two laminate films 7. Alternatively, a single laminate film may be folded and the remaining three sides then heat-sealed to produce the bag form.

Electricity-generating components 2 of film-covered battery 1 may also be a laminated form composed of positive active electrode and negative active electrode that are stacked with a separator interposed. Alternatively, electricity-generating components 2 may be in a coil form produced by stacking a strip-shaped positive active electrode and negative active electrode with a separator interposed, coiling these strips, and then compressing the coil to a flat form to produce a structure in which positive active electrodes and negative active electrodes are alternately stacked.

Alternatively, any electricity-generating components that are normally used in batteries can be applied as electricity-generating components 2 as long as the components include a positive electrode, a negative electrode, and an electrolyte. The electricity-generating components in a lithium ion secondary battery are typically formed by forming a structure realized by arranging a positive electrode plate against a negative electrode plate with a separator interposed, the positive electrode plate being realized by applying a positive active material such as a lithium-manganese compound oxide or a cobalt oxide lithium to both sides of, for example, aluminum foil and the negative electrode plate being realized by applying a carbon material that can be lithium-doped or de-doped to both surfaces of, for example, copper foil; and then impregnating this electrode plate structure in an electrolyte that contains lithium salt. In addition to this example, examples of electricity-generating components 2 that can be offered include nickel-hydrogen batteries, nickel-cadmium batteries, lithium metal primary batteries or secondary batteries, lithium polymer batteries, and other types of chemical batteries. The present invention can further be applied to electrical devices in which an electrical device component that accumulates electric energy in its interior such as an electrolytic capacitor or a capacitor such as an electric double layer capacitor is sealed in a sheathing film.

Positive electrode terminal 3 that is electrically connected to the positive active electrode and negative electrode terminal 4 that is electrically connected to the negative active electrode each extend in opposite directions from heat-seal parts 7a of the minor axis direction of film-covered battery 1. Aluminum is usually used as positive electrode terminal 3 and copper or nickel is usually used as negative electrode terminal 4 due to their electrical properties. In the following explanation, positive electrode terminal 3 and negative electrode terminal 4 are at times referred to as simply "electrodes."

Gas exhaust part 8 in which the heat-seal strength is made weaker than in other portions and in which the heat seal is unpeeled by lower pressure than in other portions is provided in a portion of heat-seal parts 7a in the major axis direction of film-covered battery 1.

When a voltage outside the standard limits is applied to a battery when the battery is in use, gas is generated by the electrolysis of the electrolytic solvent medium and the internal pressure of the battery rises. When the battery is used at a temperature beyond the standard limits, gas may be produced by the decomposition of electrolytic salt. Basically, the battery is ideally used within the standard limits such that gas is not generated, but a large amount of gas may be generated when the control circuit of the battery malfunctions for some reason and an abnormal voltage is applied or when for whatever reason the ambient temperature becomes abnormally hot.

This generation of gas within the battery causes an increase in the internal pressure of the battery. To prevent the battery from exploding due to an extreme rise in internal pressure, most batteries that employ a metal cylinder as a sheathing material include a pressure-relief valve that releases gas outside the battery when the internal pressure of the battery is excessive. However, in a film-covered battery that uses film as the sheathing material, the provision of a pressure relief valve is problematic from the standpoint of structure. When the internal pressure of a film-covered battery increases excessively, the film swells until the sheathing material finally ruptures and gas is ejected from the point of rupture. Because the point of rupture cannot be specified, the surrounding equipment is adversely affected depending on the point of rupture.

In film-covered battery 1, however, the above-described gas exhaust part 8 is provided in heat-seal parts 7a to eliminate these problems that result from the generation of gas inside the battery.

Figure 2:
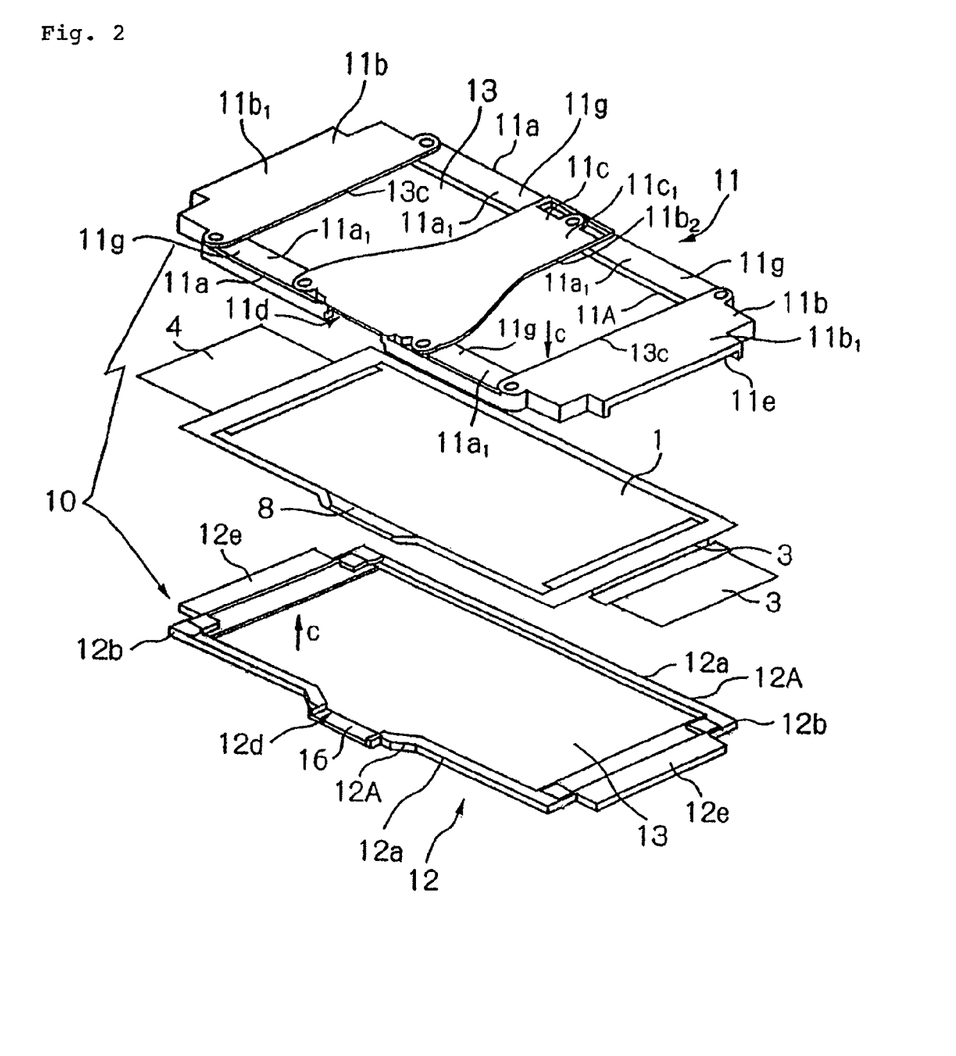
FIG. 2 is an exploded perspective view of the cell case of the first embodiment that houses a film-covered battery.
Figure 3:
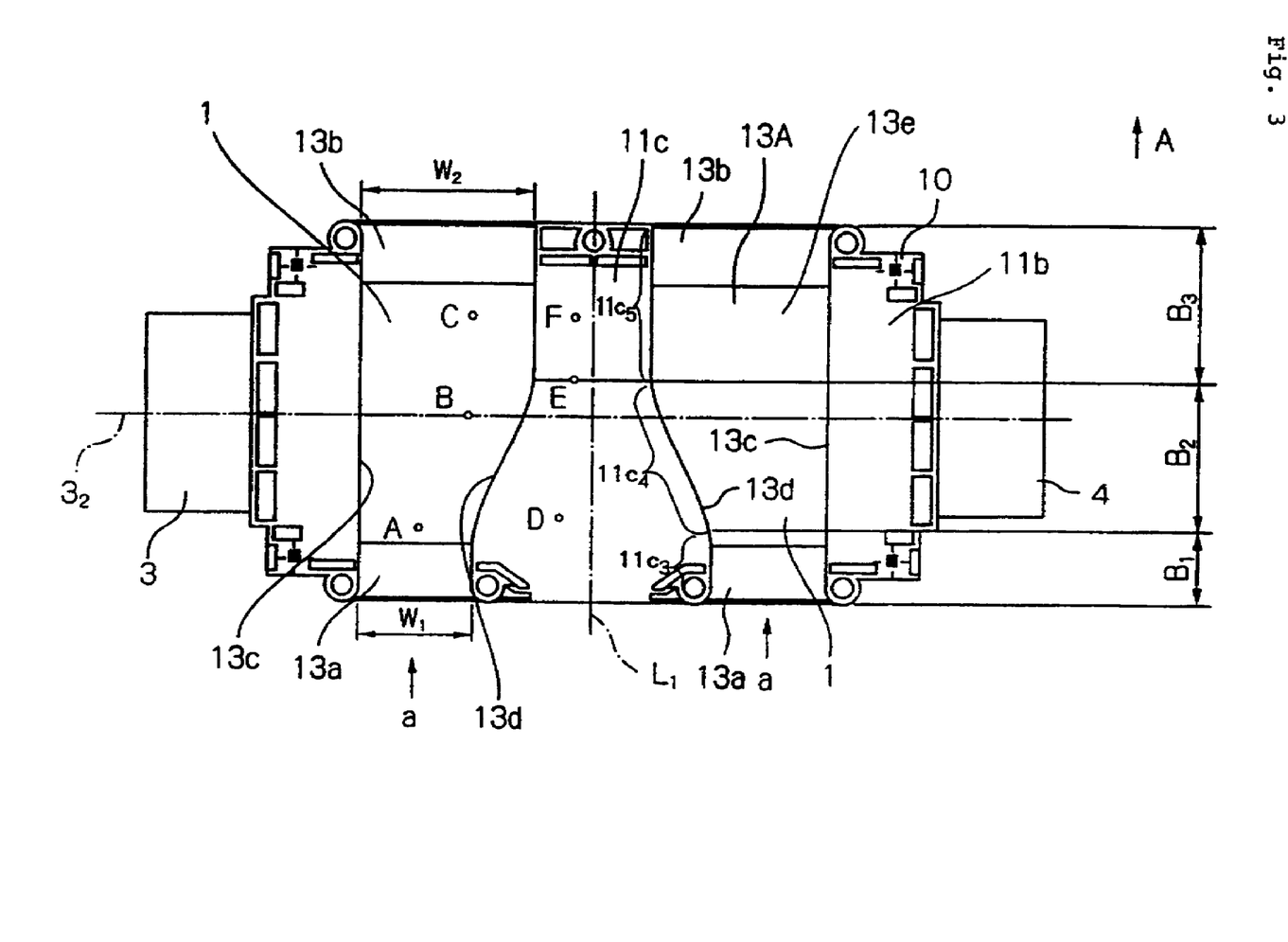
FIG. 3 is an upper plan view of the cell case in which a film-covered battery is housed.
Figure 4:
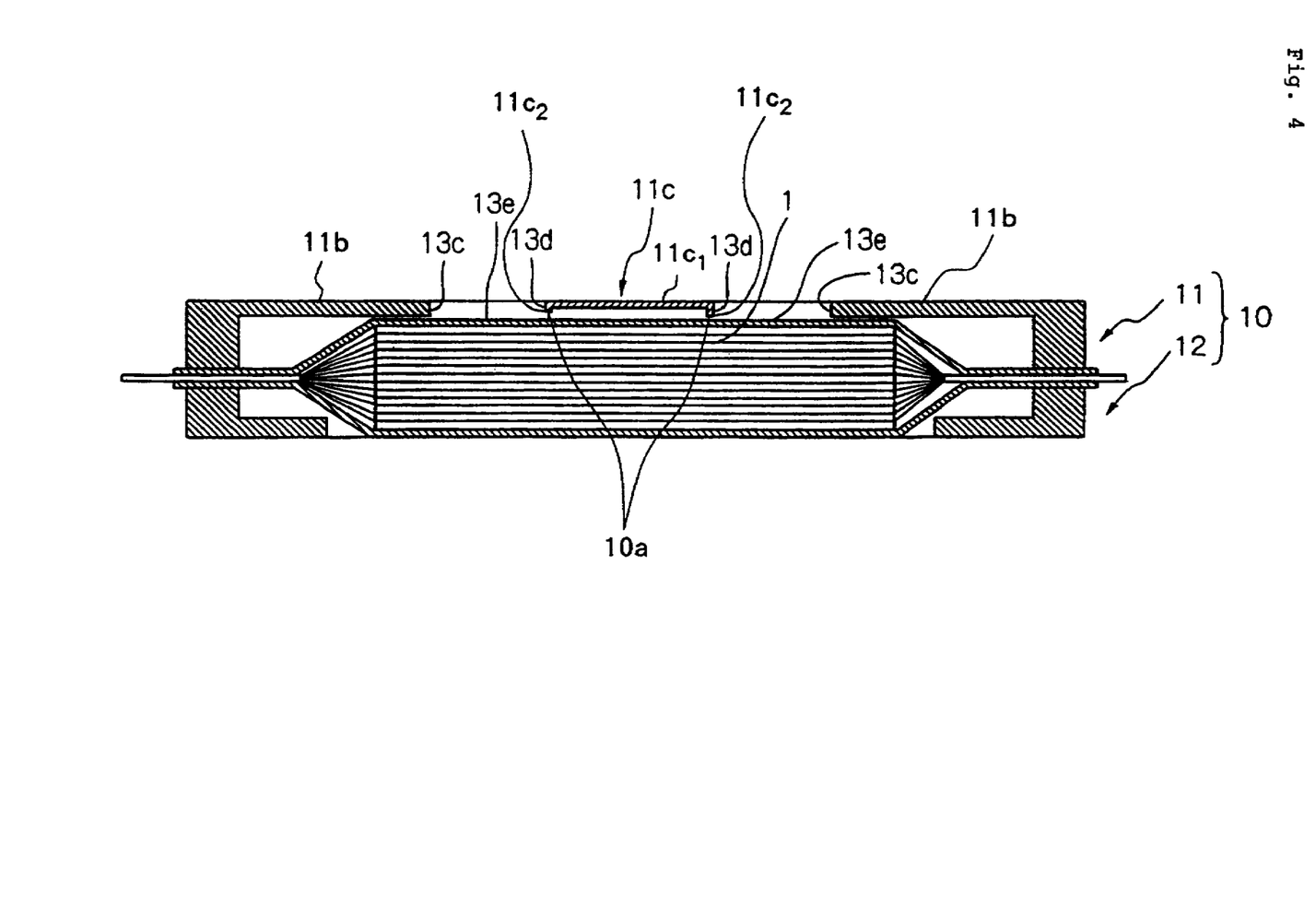
FIG. 4 is a side sectional view of the cell case in which a film-covered battery is housed.
Figure 5:
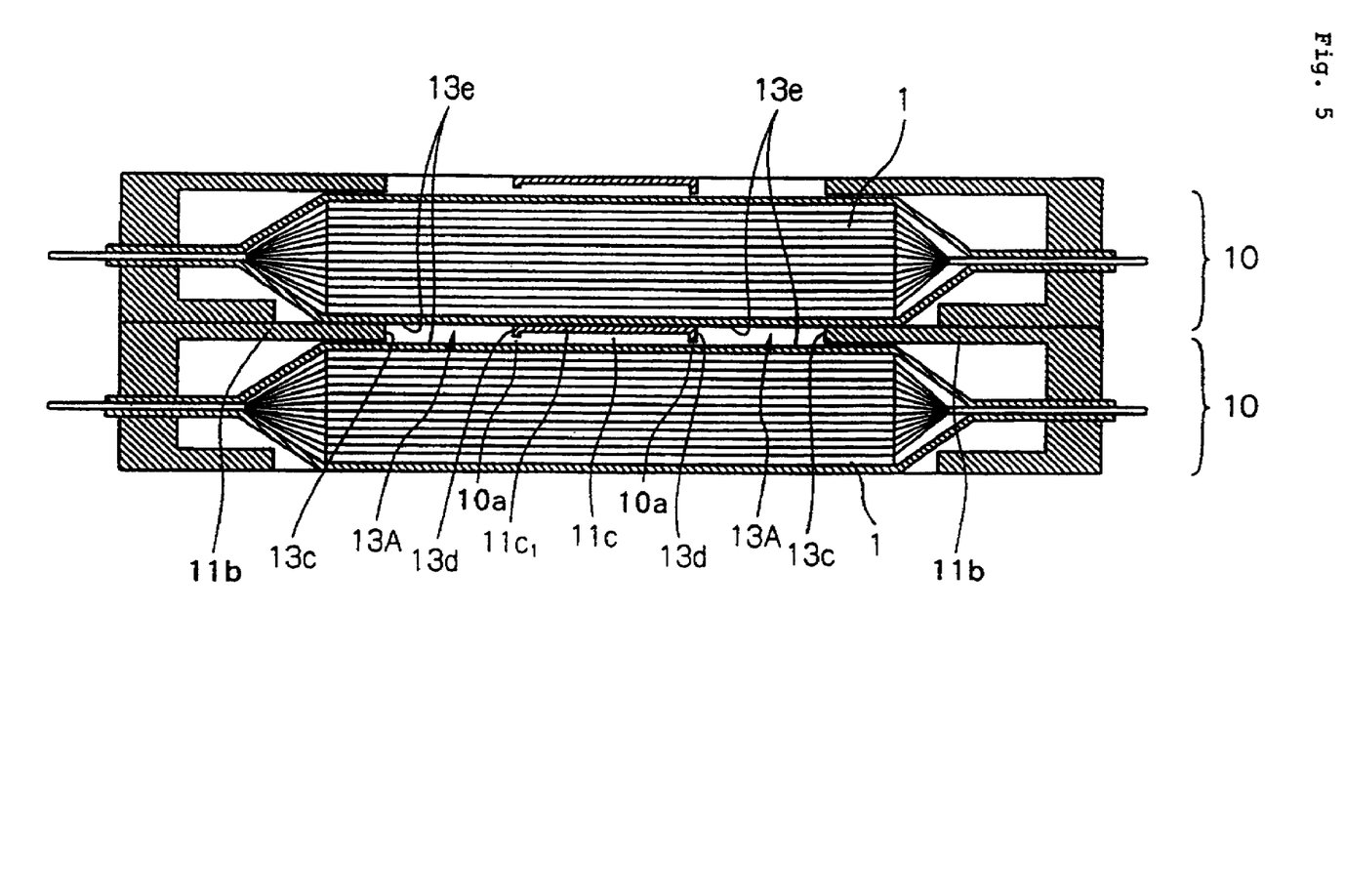
FIG. 5 is a side sectional view of cell cases stacked in two layers with film-covered batteries housed.
Figure 6:
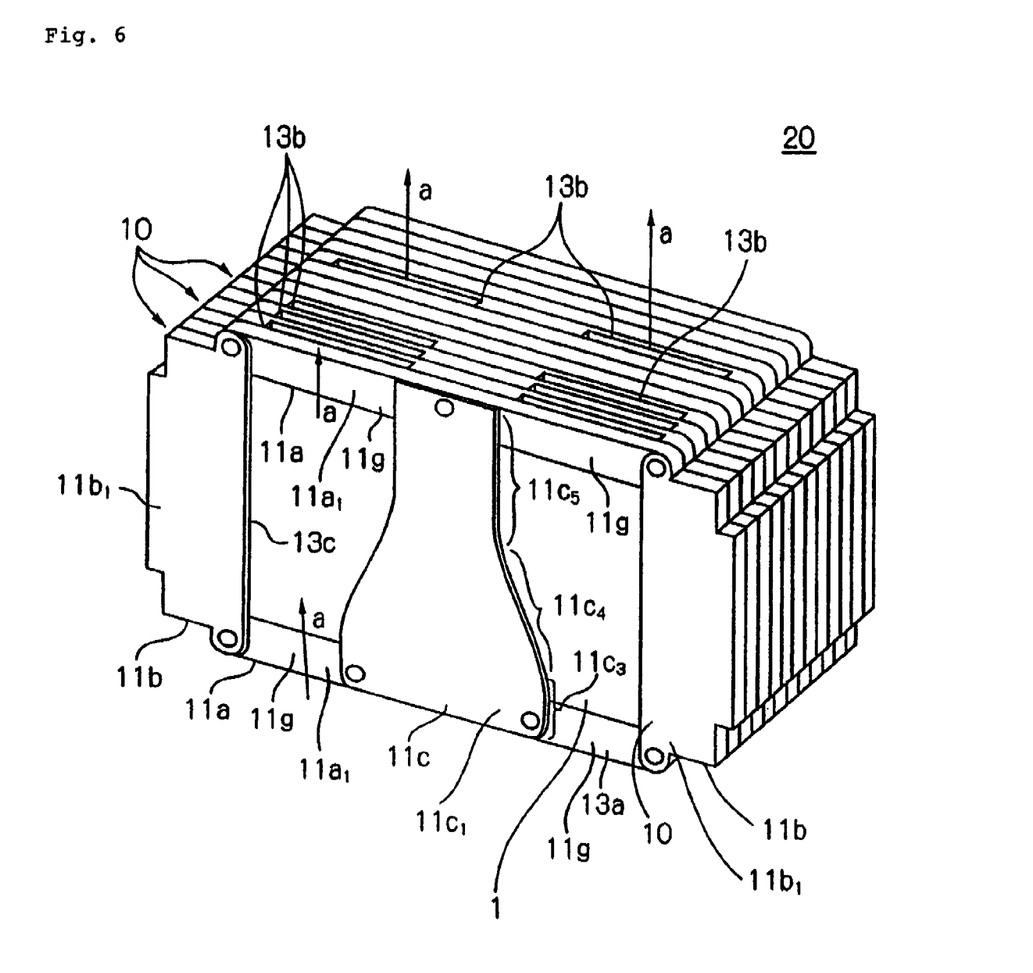
FIG. 6 is a perspective view showing an example of a combined battery realized by stacking cell cases.

FIG. 2 is an exploded perspective view of the cell case of the present embodiment. FIG. 3 is an upper plan view of the film-covered battery that is housed inside the cell case. FIG. 4 is a schematic side sectional view of the cell case that houses the film-covered battery. FIG. 5 is a schematic side sectional view of a state in which two cell cases are stacked. Finally, FIG. 6 is a perspective view showing an example of a combined battery realized by stacking cell cases.

Cell case 10 includes first frame 11 and second frame 12 and is of a configuration in which film-covered battery 1 is held clasped between these two frames 11 and 12. Each of frames 11 and 12 is of a frame shape, and opening 13 is formed at a position that corresponds to electricity-generating components 2 of film-covered battery 1.

First frame 11 is a rectangular frame made up from two opposing long sides 11a and two short sides 11b that are formed substantially orthogonal to these long sides 11a and opposite each other. Heat-seal parts 7a of film-covered battery 1 are held and secured inside cell case 10 by being partially clasped by a clasping portion formed from confronting surfaces 11A (also referred to as "inner surfaces") of first frame 11 and confronting surfaces 12A (also referred to as "inner surfaces") of second frame 12.

Long sides 11a are linked by gas exhaust passage 11c for guiding gas that is exhausted from gas exhaust part 8 of film-covered battery 1 to the outside.

Referring to FIGS. 2 and 3, gas exhaust passage 11c is formed in a shape that generally narrows from wide portion $11c_3$ and toward narrow portion $11c_5$. To describe in greater detail, gas exhaust passage 11c includes wide portion $11c_3$, narrow portion $11c_5$, and contracting portion $11c_4$. Wide portion $11c_3$ is located on the inlet 13a side (the gas exhaust part 8 side). Narrow portion $11c_5$ is located on the outlet 13b side and is formed narrower than wide portion $11c_3$. Contracting portion $11c_4$ smoothly links wide portion $11c_3$ and wide portion $11c_5$. The profile shape of this gas exhaust passage 11c is a C-shape (see FIG. 4) and includes main surface $11c_1$ and exhaust passage side surfaces $11c_2$ formed to stand out from both sides of main surface $11c_1$. As will be described hereinbelow, gas exhaust passage 11c forms cooling channel 13A together with short sides 11b and film-covered battery 1. Exhaust passage side surfaces $11c_2$ are also used as second cooling channel side walls 13d of cooling channel 13A. Gap 10a (see FIGS. 4 and 5) of a size that allows cooling air that flows through cooling channel 13A to flow into gas exhaust passage 11c is formed between exhaust passage side surfaces $11c_2$ (second cooling channel side walls 13d) and the surface of film-covered battery 1. The cooling air is supplied from an outside cooling air supply device (not shown).

In the present embodiment, gas exhaust part 8 of film-covered battery 1 is formed in substantially the center of heat-seal part 7a. Gas exhaust passage 11c is formed in substantially the center of long side 11a to match with this gas exhaust part 8. In addition, notch 11d for forming gas outlet 16 is formed at one end of gas exhaust passage 11c, which is one of long sides 11a.

Notches 11e for extending to the outside the electrodes of film-covered battery 1 that is housed in cell case 10 are formed in each short side 11b of first frame 11.

Of the surfaces of each short side 11b, outer surfaces $11b_1$ of the side opposite the inner surface that is the side that contacts each short side 11b of film-covered battery 1 is positioned 1.0 mm higher than outer surfaces $11a_1$ of the portions of long sides 11a between each short side 11b and gas exhaust passage 11c that crosses between long sides 11a.

Outer surfaces $11b_1$ are positioned 1.0 mm higher than outer surfaces $11a_1$. Outer surfaces $11b_1$ are the surfaces on the opposite side of the surface that contacts each short side 11b of film-covered battery 1. Outer surfaces $11a_1$ are the portions between each short side 11b and gas exhaust passage 11c that crosses between long sides 11a. In addition, main surface $11c_1$ of gas exhaust passage 11c is also positioned 1.0 mm higher than outer surfaces $11a_1$ of long sides 11a. In other words, changes in level 11g of 1.0 mm exist between outer surfaces $11a_1$ of long sides 11a and each of outer surfaces $11b_1$ of short sides 11b and main surface $11c_1$ of gas exhaust passage 11c.

Second frame 12 is basically of the same construction as first frame 11. Second frame 12 is also a rectangular frame composed of two long sides 12a and two short sides 12b. Notch 12d for forming gas outlet 16 is formed in one of long sides 12a. In contrast to first frame 11, second frame 12 is not provided with gas exhaust passage 11c. In addition, second frame 12 is provided with electrode holding parts 12e that fit into notches 11e of first frame 11. The thickness of electrode holding parts 12e is formed to a thickness that enables openings through which electrodes can extend when electrode holding parts 12e are fitted into notches 11e.

Explanation next regards the configuration of cooling channel 13A that is made up from gas exhaust passage 11c, short sides 11b, and film-covered battery 1. Cooling channels 13A are passages for the cooling air for cooling electricity-generating components 2 of film-covered battery 1 and are formed by stacking cell cases 10. In other words, cooling channels 13A are formed from: first cooling channel side walls 13c, second cooling channel side walls 13d, and heat discharge surface 13e of film-covered battery 1 (see FIG. 4 and FIG. 5). First cooling channel side walls 13c are composed of the end surfaces of short sides 11b. Second cooling channel side walls 13d are composed of gas passage side surfaces $11c_2$ of gas exhaust passage 11c that has a C-shaped profile. Heat discharge surfaces 13e are made up from the surface of film-covered battery 1 that is housed inside cell case 10 and the surface of film-covered battery 1 that is housed inside neighboring cell case 10.

Cooling air flows into cooling channel 13A from inlet 13a, and flows out from outlet 13b. In other words, the cooling air contacts the surface of film-covered battery 1 to capture heat and flows in the direction of arrows a in FIG. 3 while undergoing expansion.

Inlet 13a is formed from level changes 11g on the wide portion $11c_3$ side of gas exhaust passage 11c and the outer surface of adjacent stacked second frame 12. In addition, outlet 13b is formed from level changes 11g on the narrow portion $11c_5$ side of gas exhaust passage 11c and the outer surface of adjacent stacked second frame 12. In the present embodiment, inlet 13a has a height of 1 mm and a width $w_1$ of 38 mm, and outlet 13b has a height of 1 mm and a width $w_2$ of 58.5 mm. In addition, this inlet 13a and outlet 13b are formed on both sides of gas exhaust passage 11c. In other words, inlets 13a and outlets 13b are each formed in two locations. As a result, the area of the opening of inlets 13a in the present embodiment is 1 mm×38 mm×2=76 mm$^2$, and the area of the opening of outlets 13b is 1 mm×58.5 mm×2=117 mm$^2$.

Referring to FIG. 5, gap 10a is formed between cooling channel side walls 13d of gas exhaust passage 11c and the surface of film-covered battery 1. Cooling air is able to flow into gas exhaust passage 11c from gap 10a. In addition, although main surface $11c_1$ of gas exhaust passage 11c is depicted in close contact with the surface of adjacent film-covered battery 1 in FIG. 5, a slight gap is formed between this main surface $11c_1$ and the surface of film-covered battery 1. Cooling air is also able to pass through this gap.

Again referring to FIG. 3, cooling channel 13A is broadly divided into inflow area $B_1$, expansion area $B_2$, and outflow area $B_3$. Inflow area $B_1$ is an area having width $w_1$ ($<w_2$), and outflow area $B_3$ is an area having width $w_2$.

Expansion area $B_2$ is an area in which the flow path profile becomes larger by increase of the width of the flow path from width $w_1$ to width $w_2$. In other words, expansion area $B_2$ is an area in which the distance between first cooling channel side walls 13c and exhaust passage side surfaces $11c_2$ (second cooling channel side walls 13d) increases with progression from inlet 13a and toward outlet 13b. Inflow area $B_1$ of cooling channel 13A corresponds to wide portion $11c_3$ of gas exhaust passage 11c. Expansion area $B_2$ of cooling channel 13A corresponds to contraction portion $11c_4$ of gas exhaust passage 11c. Outflow area $B_3$ of cooling channel 13A corresponds to narrow portion $11c_5$ of gas exhaust passage 11c.

The main flow of cooling air flows in cooling channel 13A.

The main flow of cooling air first flows into cooling channel 13A from inlet 13a.

The main flow of cooling air that has flowed into cooling channel 13A begins to capture heat from the surface of film-covered battery 1 in inflow area $B_1$ and begins to expand. The main flow of expanded cooling air flows into gradually broadening expansion area $B_2$. The main flow of cooling air flows into outflow area $B_3$ that is wider than inflow area $B_1$ while expanding further by capturing heat in expansion area $B_2$. The main flow of cooling air further flows toward outlet 13b while continuing to capture heat and continuing to expand in outflow area $B_3$. The main flow of cooling air that has captured heat and expanded finally flows out from outlet 13b that is wider than inlet 13a. In addition, as described hereinabove, a portion of the cooling air also flows into gas exhaust passage 11c and cools the surface of film-covered battery 1 that faces this gas exhaust passage 11c.

In the present embodiment, the area up to a length of 24 mm from the end surface of inlet 13a is inflow area $B_1$, and the area up to 74 mm from the end surface of inlet 13a is expansion area $B_2$. In addition, exhaust passage side surfaces $11c_2$ of gas exhaust passage 11c (second cooling channel side walls $13_d$ are formed as curved surfaces in the boundary area between inflow area $B_1$ and expansion area $B_2$ and in the boundary between expansion area $B_2$ and outflow area $B_3$ so as not to impede the flow of cooling air. The boundary portions in the present embodiment are formed at R30.

As described in the foregoing explanation, cooling channel 13A in the present embodiment is formed such that the area of the opening on the outlet 13b side is greater than the area of the opening on the inlet 13a side. Cooling air that flows through the inlet 13a side has not yet captured heat from the film-covered electrical device and therefore is at a low temperature and high density. In contrast, cooling air that flows through the outlet 13b side has captured heat from film-covered battery 1 and is therefore at a high temperature and expanded. In other words, in cooling channel 13A of the present embodiment, the area of the opening on the outlet 13b side is made greater in accordance with the increase in volume of the cooling air caused by expansion. The cooling air that has increased in temperature can therefore be effectively expelled from outlet 13b without undergoing stagnation in cooling channel A.

In addition, cooling channel 13A of the present embodiment is of a configuration in which first cooling channel side walls 13c take advantage of short sides 11b and 12b and second cooling channel side walls 13d take advantage of exhaust passage side surfaces $11c_2$, whereby a cooling channel need not be newly formed. This configuration is therefore advantageous from the standpoint of simplified construction and cost.

In the present embodiment, exhaust passage side surfaces $11c_2$ are formed so as to be also used as second cooling channel side walls 13d, but the present invention is not limited to this form. For example, side walls in which the flow path width broadens in the direction of flow may also be provided separately from exhaust passage side surfaces $11c_2$. In addition, first cooling channel side walls 13c that are composed of short sides 11b and 12b are shown in linear form in the present embodiment, but the present invention is not limited to this form. In other words, first cooling channel side walls 13c may also be side walls of a shape in which the flow path width broadens in the direction of flow similar to second cooling channel side walls 13d.

A configuration in which the flow path widths of inflow area $B_1$ and outflow area $B_3$ are fixed and the flow path width broadens in the direction of flow of cooling air only in expansion area $B_2$ was shown by way of example in the present embodiment, but the present invention is not limited to this form. In other words, cooling channel 13A may also be of a configuration in which the flow path width or the area of the flow path gradually increases in all areas from inlet 13a and toward outlet 13b.

In addition, a case was shown in which the height of inlet 13a and outlet 13b was identical in the present embodiment, but the present invention is not limited to this form, and a configuration may be adopted in which the flow path also enlarges in the direction of height by using a construction in which the height on the outlet 13b side is higher than the height of inlet 13a. Still further, although a case was shown in the present embodiment in which two cooling channels 13 that were formed were both formed symmetrically with respect to center line $L_1$, the present invention is not limited to this form and may be of an asymmetric form. Still further, the number of cooling channels 13 is not limited to two, but may be formed as only one, or three or more may be formed.

A construction was shown in which first and second frames 11 and 12 are formed with openings 13, but the present invention is not limited to this form, and a construction may also be adopted in which wall surfaces are provided in the portions of openings 13. In other words, in the present embodiment, one of the side surfaces of cooling channel 13A is formed from the surface of film-covered battery 1 that is housed in adjacent cell case 10, and as a result, at least two cell cases 10 that house film-covered batteries 1 are required to form cooling channel 13A. In contrast, cooling channel 13A can be formed in one cell case 10 by providing a wall surface to block opening 13 and then taking this wall surface as a wall surface that forms cooling channel 13A. The wall surface that blocks opening 13 may be formed monolithically with first and second frames 11 and 12 or may be separate. Alternatively, the wall surface that blocks opening 13 may be a component applied only to cell cases 10 that are located on the two end sides of stacked combined battery 20 such as shown in FIG. 6.

A construction was shown in the present embodiment in which gas exhaust passage 11c, which forms cooling channel 13A that gradually enlarges with respect to the flow direction of cooling air, was provided only on first frame 11, but the present invention is not limited to this form, and a construction that forms a cooling channel that gradually enlarges with respect to the flow direction of cooling air may also be provided on the second frame 12 side.

In the present embodiment, film-covered battery 1 was used in which gas exhaust part 8 is formed in substantially the middle of the long side of heat-seal part 7a. As a result, gas exhaust passage 11c is formed in substantially the center of long side 11a to match the location of gas exhaust part 8. Cooling channel 13A is formed using exhaust passage side surfaces $11c_2$ of gas exhaust passage 11c. As a result, cooling channel 13A is of a configuration in which the direction of flow of cooling air is from one long side 11a and toward the other long side 11a. However, the present invention is not limited to this form. In other words, cell case 10 may include a cooling channel of a configuration in which the cooling air flows from one short side 11b and toward the other short side 11b.

According to the foregoing explanation, the profile shape of cooling channel 13A is substantially rectangular in the present embodiment, but the present invention is not limited to this form. To reduce loss of fluidity of the cooling air, the portion of the cooling channel that contacts the surface of film-covered battery 1 may be made a smooth R shape, and further, first cooling channel side walls 13c and second cooling channel side walls 13d may be a curved shape rather than a planar shape.

As shown in FIG. 6, combined battery 20 constructed by stacking cell cases 10 is preferably used with outlet 13b upwardly disposed. Taking into consideration the thermal expansion of the cooling air, cooling channel 13A is of a construction that enlarges in the direction of flow of cooling air so as not to obstruct the flow of the expanded cooling air. According to the properties of a fluid, the fluid typically decreases in density and becomes lighter when subjected to heat, and therefore flows upward. If these properties of a fluid are taken into consideration, a configuration in which outlet 13b is upwardly disposed is preferable.

Figure 7:
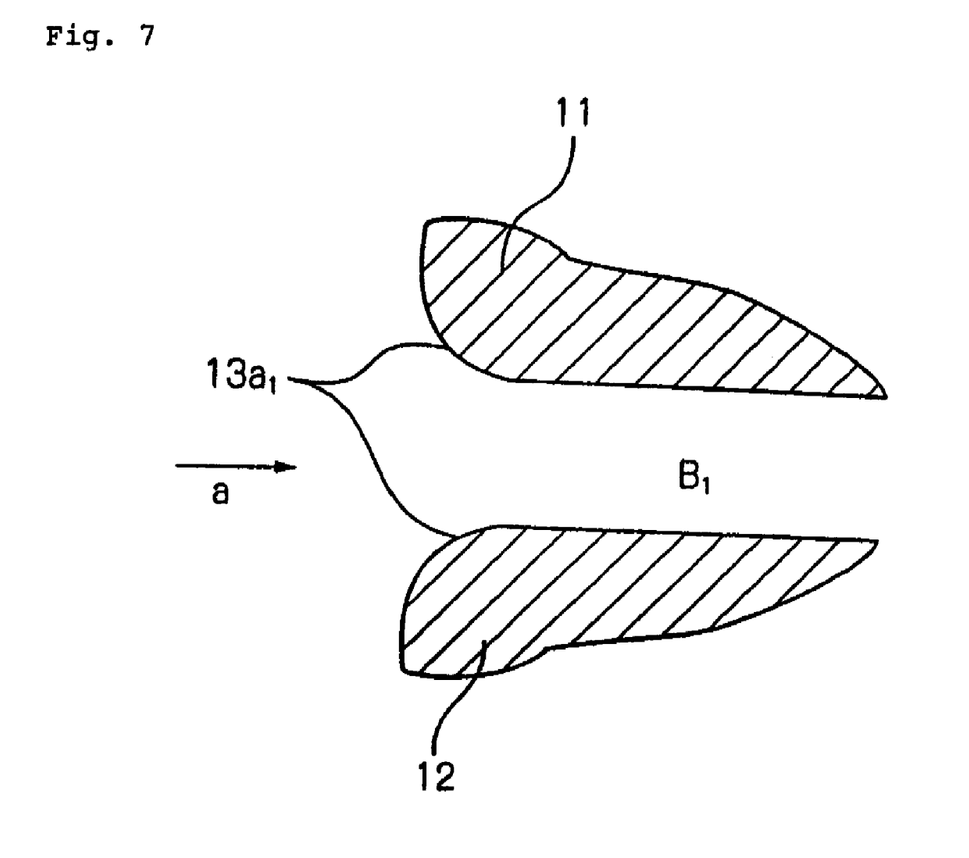
FIG. 7 is a schematic sectional view showing an example of the profile shape of the inlet.

Regarding the profile shape of inlet 13a, curved portions 13a₁ may be formed in inlet 13a as shown in FIG. 7 to raise the efficiency of inflow of the cooling air toward inflow area $B_1$. These curved portions $13a_1$ may be of any form that facilitates the inflow of cooling air to inflow area $B_1$. For example, these curved portions $13a_1$ may simply have a radius or may be curved surfaces formed using involute curves.

Each numerical value shown in the present embodiment is only an example and in no way places limitations on the present invention.

Second Embodiment

Figure 8:
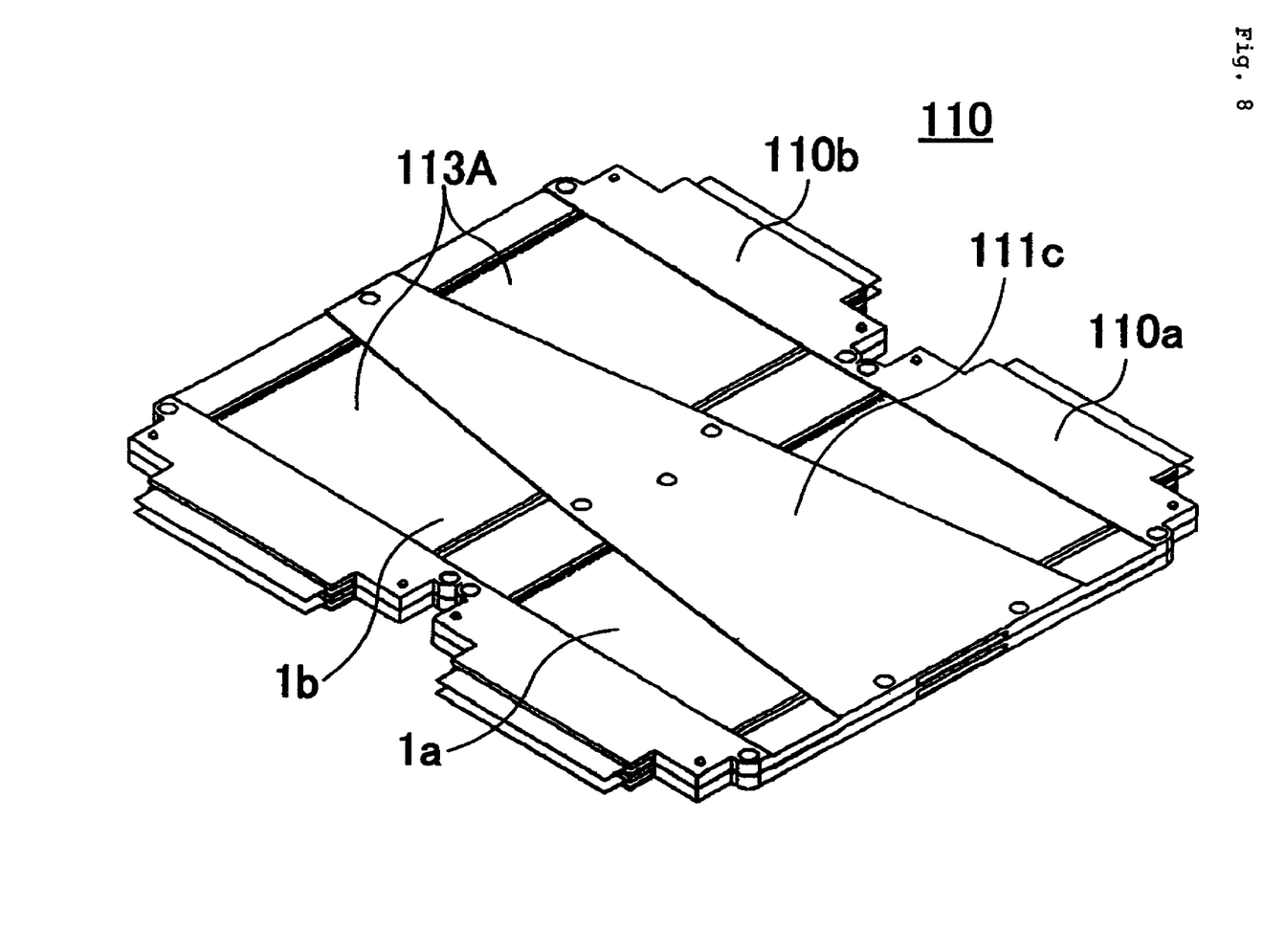
FIG. 8 is an outside perspective view of the cell case of the second embodiment.

In the present embodiment, a configuration is presented by way of example in which two parallel-arranged film-covered batteries are cooled as a group. FIG. 8 shows an outside perspective view of the cell case of the present embodiment. Cell case 110 of the present embodiment includes housing 110a and housing 110b that are arranged in parallel. Film-covered battery 1a is housed in housing 110a and film-covered battery 1b is housed in housing 110b. Two cooling channels 113A are formed on the two sides of gas exhaust passage 111c. In addition, cooling channels 113A are formed to link housing 110a and housing 110b, cooling air flowing in from housing 110a and flowing out from housing 110b. In other words, cooling air first cools film-covered battery 1a, then continues to cool film-covered battery 1b, and then is expelled.

As with cooling channel 10A in the first embodiment, cooling channels 113A of the present embodiment have a shape in which the flow path profile increases in size with progression from the inlet side and toward the outlet side. In other words, in cooling channel 113A of the present embodiment, the area of the opening on the outlet side is enlarged to accord with the increase in volume of the cooling air that results from expansion, and cooling air that has been heated can therefore be effectively exhausted from the outlet without stagnation of the cooling air inside cooling channel 113A.

In addition, in the case of the present embodiment, the employment of cell case 110 that can house a plurality of batteries in a group enables a reduction in the number of parts.

Although an example is shown in the present embodiment in which the invention of the present application is applied to a case having a form that can house two batteries in parallel, the invention is not limited to this form and the invention of the present application can also be applied to a case that houses three or more batteries in parallel.

Third Embodiment

Figure 9:
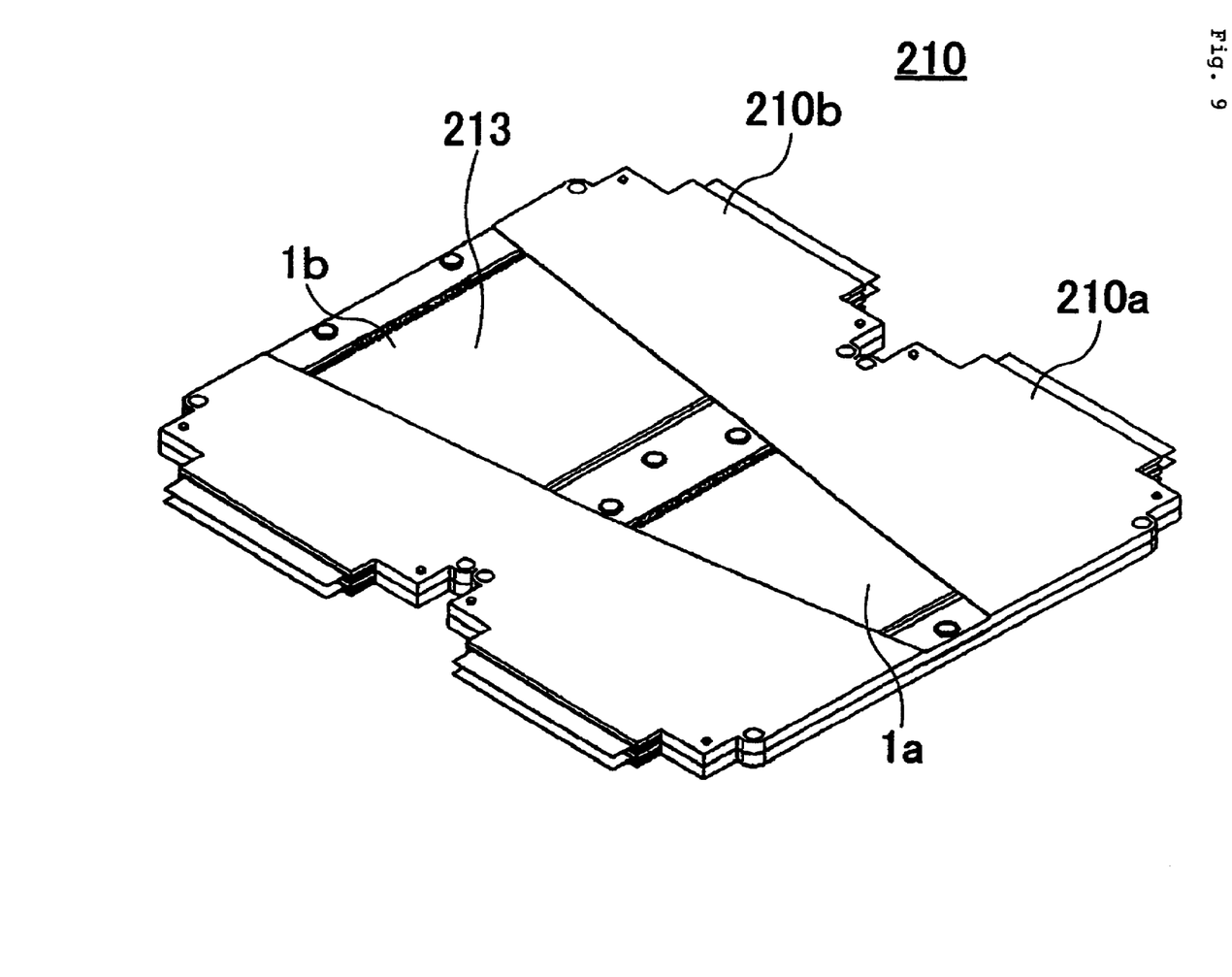
FIG. 9 is an outside perspective view of the cell case of the third embodiment.

FIG. 9 shows an outside perspective view of the cell case of the present embodiment. Cell case 210 of the present embodiment also includes housing 210a and housing 210b that are arranged in parallel, as with cell case 110 of the second embodiment. Film-covered battery 1a is housed inside housing 210a, and film-covered battery 1b is housed inside housing 210b. Cell case 210 of the present embodiment is therefore similar to cell case 110 of the second embodiment with regard to the construction for housing batteries. However, in contrast to cell case 110 in which two cooling channels 113A are formed on the two sides of gas exhaust passage 111c, cell case 210 of the present embodiment is of a configuration having only one cooling channel 213. In cooling channel 213 of the present embodiment, the area of the opening of the outlet side is increased in accordance with the increase in volume of cooling air that results from expansion, and the cooling air that has increased in temperature can therefore be effectively expelled from the outlet without stagnation inside cooling channel 213.

Fourth Embodiment

Figure 10:
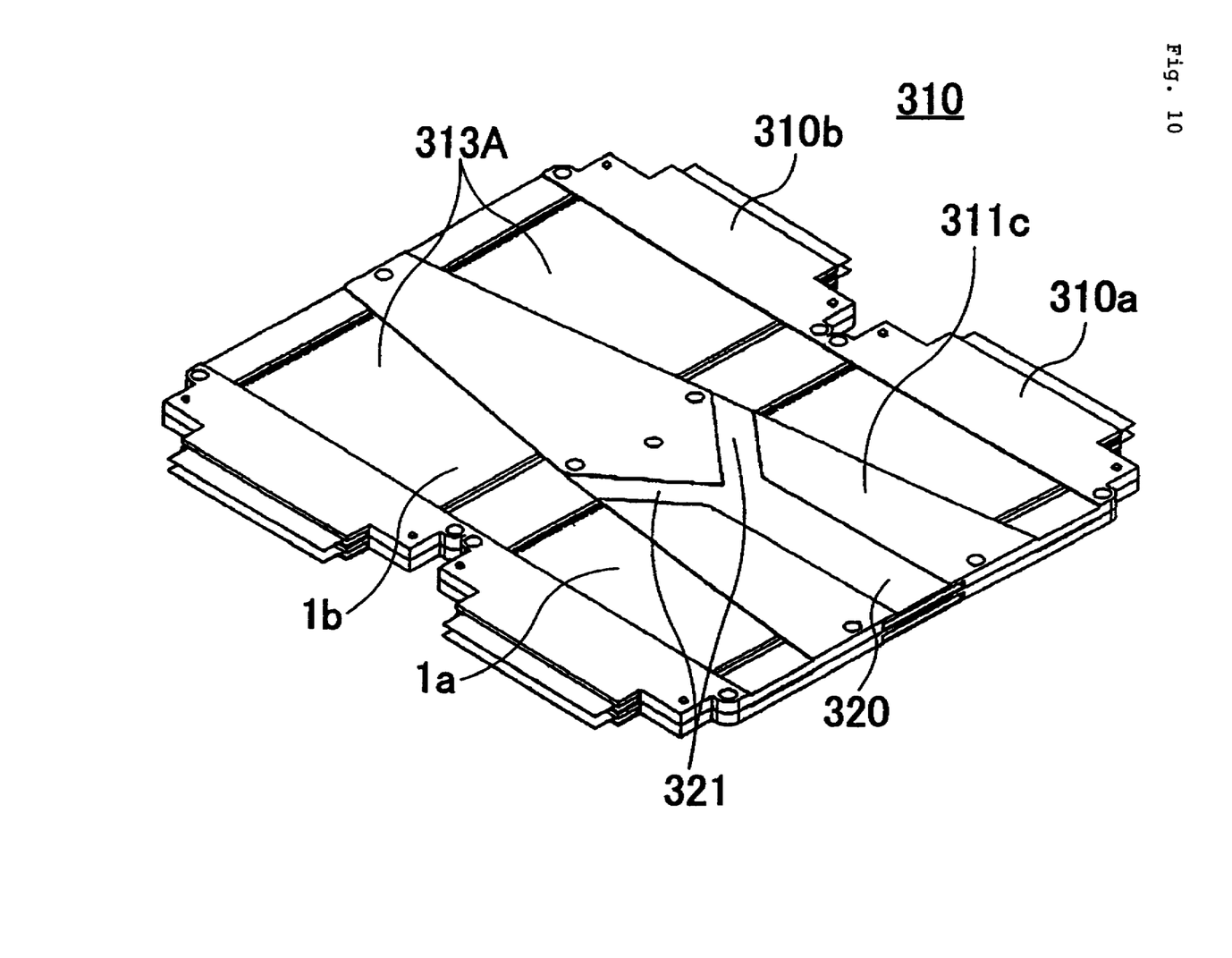
FIG. 10 is an outside perspective view of the cell case of the fourth embodiment.

FIG. 10 shows an outside perspective view of the present embodiment. As with cell case 110 of the second embodiment, cell case 310 of the present embodiment includes housing 310a and housing 310b that are arranged in parallel. Film-covered battery 1a is housed inside housing 310a, and film-covered battery 1b is housed inside housing 310b. However, cell case 310 differs from cell case 110 of the second embodiment in that cooling air supply path 320 is formed in gas exhaust passage 311c of cell case 310 of the present embodiment.

Cooling air supply path 320 is provided for supplying cooling air at a point substantially midway in the direction of flow of cooling channel 313A.

Cooling air supply path 320 includes branched paths 321 that are branched into two paths. Each of branched paths 321 supplies cooling air that flows into cooling air supply path 320 to each of two cooling channels 313A that are formed on the two sides of gas exhaust passage 311c. Cooling air that has flowed into cooling air supply path 320 is supplied to midway points of cooling channels 313A from each of branched paths 321. In the case of the present embodiment, the midway points of cooling channels 313A are between housing 310a and housing 310b.

The temperature of cooling air that flows inside cooling channels 313A rises with its progress downstream, and the temperature of the cooling air for cooling film-covered battery 1b is therefore hotter than the cooling air for cooling film-covered battery 1a. However, the supply of cooling air of a low temperature from branched paths 321 to a midway points of cooling channels 313A can lower the temperature of the cooling air for cooling film-covered battery 1b.

In the present embodiment, an example was shown in which cooling air was supplied to midway points that are between housing 310a and housing 310b, but the present invention is not limited to this form. The supply of cooling air from branched paths 321 may be upstream from the midpoint, or may be downstream from the midpoint.

In addition, branched paths 321 of the present embodiment are of a configuration for supplying cooling air to each cooling channel 313A from one point, but the present invention is not limited to this form. For example, a configuration is also possible in which cooling air is supplied from cooling air supply path 320 to one cooling channel 313A from two or more points.

In addition, the configuration of the present embodiment is not limited to a cell case that houses a plurality of film-covered batteries but can also be applied to a cell case that houses a single battery.

Working Example

Figure 11:
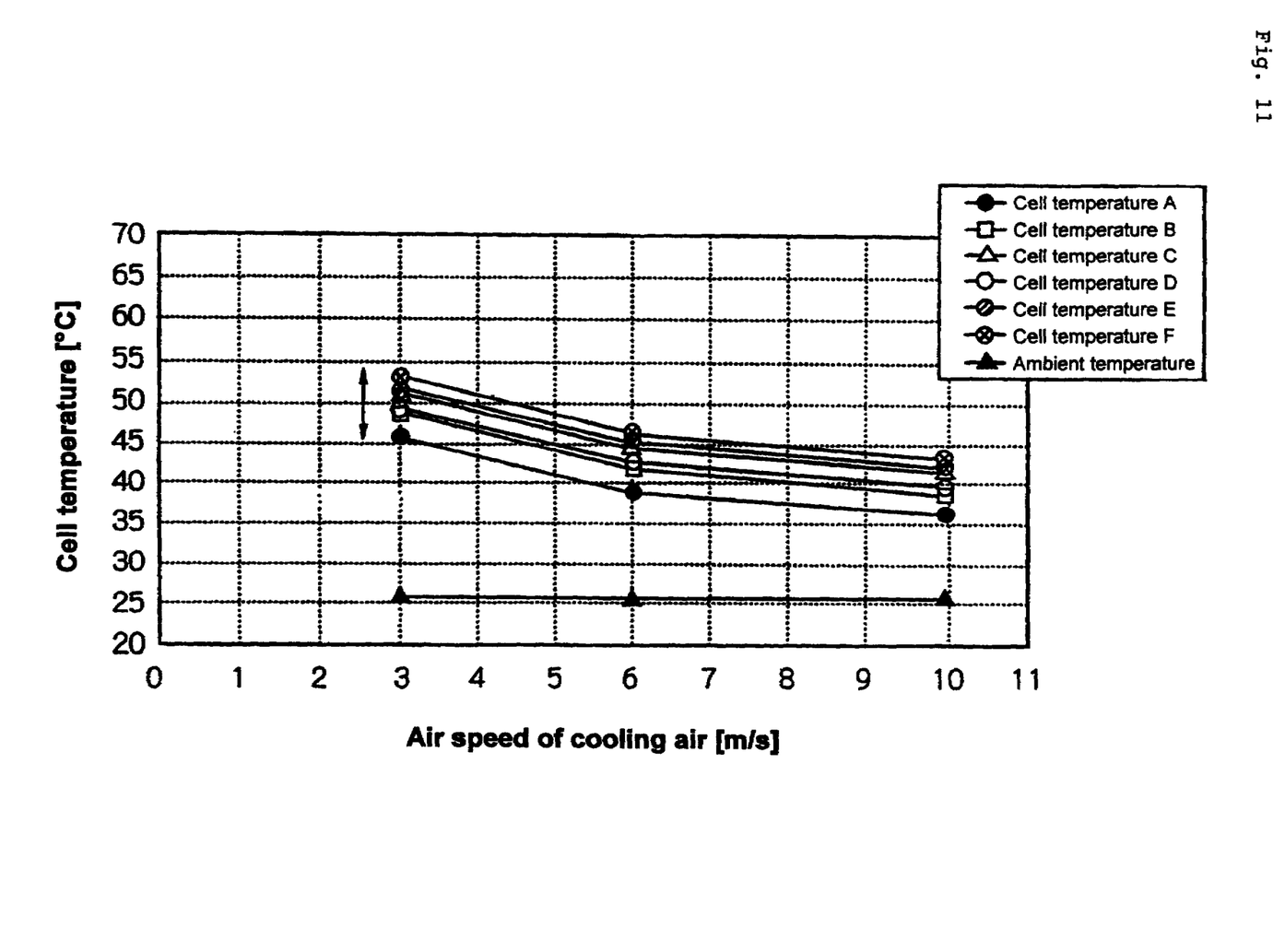
FIG. 11 is a graph showing the surface temperature of each part of the film-covered battery with respect to the air speed of the cooling air.

The graph of FIG. 11 shows the results of measuring the temperature of each part on the surface of film-covered battery 1 when cooling air is introduced into cell case 10 shown in the first embodiment.

In the present embodiment, a combined battery was used in which cell cases 10 that each house film-covered battery 1 are stacked in four layers, and as a result, three cooling channels 13A were formed.

The horizontal axis of the graph of FIG. 11 is the air speed of the cooling air in outlet 13b, and the vertical axis is the surface temperature at each point of film-covered battery 1 for each air speed.

In the present working example, the air speed of the cooling air was varied over 3 m/s, 6 m/s, and 10 m/s, and the surface temperature was measured at points A-F (see FIG. 3) of film-covered battery 1 for each air speed. The outside temperature was 25° C., and "cell" in the graph indicates film-covered battery 1. The dimensions of inlet 13a and outlet 13b and the distances of inflow area $B_1$ and expansion area $B_2$ are as described in the foregoing explanation. In other words, the area of the opening of inlet 13a is 76 mm$^2$, and the area of the opening of outlet 13b is 117 mm$^2$. Inflow area $B_1$ is up to a length of 24 mm from the end surface of inlet 13a, and expansion area $B_2$ is up to 74 mm from the end surface of inlet 13a.

Points A-F of FIG. 3 all indicate the measurement points at which the temperature of the surface of film-covered battery 1 was measured. The temperature inside cooling channel 13A was measured at points A-C, and the temperature inside gas exhaust passage 11c was measured at points D-F.

Although the end surfaces of both side walls of gas exhaust passage 11c contact the surface of film-covered battery 1, the area is not packed with sealant, and as a result, cooling air that flows in cooling channels 13A flows into gas exhaust passage 11c. However, the interior of gas exhaust passage 11c is not directly exposed to cooling air and the amount of flow of cooling air is relatively small compared to the interior of cooling channels 13A. The battery is therefore difficult to cool.

Point A is a measurement point for measuring the temperature in the vicinity of inlet 13a and is located in the center of inlet 13a.

Point B is a measurement point for measuring the temperature of a point midway between inlet 13a and outlet 13b, and is located on centerline $L_2$ of FIG. 2, and at the middle point of centerline $L_1$ and cooling channel side wall 13c.

Point C is a measurement point for measuring the temperature in the vicinity of outlet 13b, and is located in the vicinity of outlet 13b and on the middle point of centerline $L_1$ and cooling channel side wall 13c.

Point D is in gas exhaust passage 11c and is located in the vicinity of inlet 13a.

Point E is located in gas exhaust passage 11c and in the vicinity of the end portion expansion area $B_2$. Point F is located in gas exhaust passage 11c and in the vicinity of outlet 13b.

As shown in the graph of FIG. 11, the temperature distribution from the inlet 13a side in cooling channels 13A and up to outlet 13b is contained within 5° C. Even if Points D-F in gas exhaust passage 11c are included, the overall temperature distribution is clearly within a range of approximately 10° C.

It was confirmed that by setting the air speed to 10 m/s, the surface temperature of film-covered battery 1 could be set within the desired temperature range (35° C.-45° C.).

In a typical configuration of a cooling channel of the related art, the flow path profile on the inlet side is wider than on the outlet side, which is the reverse of the invention of the present application. Enlarging the inlet side suppresses the flow speed of cooling air in the vicinity of the inlet, and the flow over the surface of the film-covered battery at low flow speed gains time for capturing the heat from the film-covered battery. Constricting the area of the flow path in the vicinity of the outlet accelerates the flow speed and thus rapidly expels to the outside the cooling air that has captured heat and attained a high temperature. This type of cooling method of the related art is considered appropriate.

However, this method constricts the area of the flow path, contrary to the progressive increase in volume of the cooling air due to thermal expansion, and therefore carries the danger of obstructing the flow of cooling air.

In contrast, in cooling channel 13A of the present invention, the area of the flow path is enlarged in accordance with the progressive increase in volume of the cooling air due to thermal expansion. By supplying cooling air at a prescribed air speed in this type of cooling channel 13A, the surface temperature of film-covered battery 1 can be contained within a desired temperature range, and this effect has been confirmed by the present working example.

What is claimed is:

1. An assembly comprising a film-covered electrical device in which electrical device components that can charge and discharge electricity are covered by a film and comprising a case for the film-covered electrical device that is composed of two frames for housing the film-covered electrical device, and further, comprising in either one of said frames a gas exhaust passage portion for guiding to the outside gas that has been expelled from a gas exhaust part provided in said film of said film-covered electrical device; wherein:

inner surfaces are formed on opposing surfaces of said frames that confront each other, said inner surfaces clasping heat-seal parts of the periphery of said film that have been heat-sealed in said heat-seal parts, and wherein unevenness is provided on the outer surfaces that are the surfaces on the opposite sides of said inner surfaces;

when stacking with other cases for film-covered electrical devices, an inlet and an outlet of cooling channel through which cooling air flows that is supplied from the outside for cooling said film-covered electrical device are formed between said outer surfaces of said frames and the frames of said other cases for film-covered electrical devices;

said wall surfaces of said cooling channel include: side walls of said exhaust passage portion, said frames, the surfaces of said film-covered electrical devices in said case for film-covered electrical devices, and surfaces of said other film-covered electrical devices inside said other cases for film-covered electrical devices; and the area of the opening of said outlet is greater than the area of the opening of said inlet, and moreover, comprising an area in which the flow path profile of said cooling channel becomes larger with progression from said inlet and toward said outlet.

2. A film-covered electrical device assemblage comprising two or more of the assembly according to claim 1 and realized by stacking two or more cases for the film-covered electrical devices that house said film-covered electrical devices.

* * * * *

UNITED STATES PATENT AND TRADEMARK OFFICE
CERTIFICATE OF CORRECTION

| | | |
|---|---|---|
| PATENT NO. | : 7,892,666 B2 | |
| APPLICATION NO. | : 11/813325 | |
| DATED | : February 22, 2011 | |
| INVENTOR(S) | : Hisako Nakano, Takaaki Fujitani and Tetsuo Kobayashi | |

It is certified that error appears in the above-identified patent and that said Letters Patent is hereby corrected as shown below:

Title Page,

Delete:

"(*) Notice:   Subject to any disclaimer, the term of this patent is extended or adjusted under 35 U.S.C. 154(b) by 705 days.

This patent is subject to a terminal disclaimer."

Add:

This patent is not subject to any terminal disclaimer.

Signed and Sealed this
Nineteenth Day of July, 2011

David J. Kappos
*Director of the United States Patent and Trademark Office*